United States Patent
Fiskari

(10) Patent No.: US 12,435,951 B2
(45) Date of Patent: Oct. 7, 2025

(54) SIGHT

(71) Applicant: EX CORPORATION OY, Helsinki (FI)

(72) Inventor: Jukka Fiskari, Helsinki (FI)

(73) Assignee: EX CORPORATION OY, Helsinki (FI)

( * ) Notice: Subject to any disclaimer, the term of this patent is extended or adjusted under 35 U.S.C. 154(b) by 116 days.

(21) Appl. No.: 18/472,845

(22) Filed: Sep. 22, 2023

(65) Prior Publication Data

US 2025/0102274 A1  Mar. 27, 2025

(51) Int. Cl.
| | |
|---|---|
| *F41G 1/54* | (2006.01) |
| *F41G 3/32* | (2006.01) |
| *G01S 7/40* | (2006.01) |
| *G01S 13/58* | (2006.01) |
| *G01S 13/72* | (2006.01) |

(52) U.S. Cl.
CPC ............. *F41G 1/545* (2013.01); *F41G 3/323* (2013.01); *G01S 7/4004* (2013.01); *G01S 13/582* (2013.01); *G01S 13/723* (2013.01)

(58) Field of Classification Search
CPC ........ F41G 1/545; F41G 3/323; G01S 7/4004; G01S 13/582; G01S 13/723
See application file for complete search history.

(56) References Cited

U.S. PATENT DOCUMENTS

| | | | | |
|---|---|---|---|---|
| 6,244,536 | B1 * | 6/2001 | Cloutier | F41G 7/2286 701/4 |
| 6,564,787 | B1 * | 5/2003 | Barry | F41B 3/005 124/20.1 |
| 7,926,408 | B1 * | 4/2011 | Kley | F42B 10/40 89/41.17 |
| 2006/0103834 | A1 * | 5/2006 | Royster, Jr. | G01P 3/685 356/28 |
| 2010/0253932 | A1 * | 10/2010 | Shapira | G01S 17/88 356/28 |

FOREIGN PATENT DOCUMENTS

EP  1598631 A1 * 11/2005 ............... F41G 3/10

* cited by examiner

*Primary Examiner* — Tuyen K Vo
(74) *Attorney, Agent, or Firm* — Meunier Carlin & Curfman LLC

(57) ABSTRACT

An apparatus for providing information for adjusting a sight of a projectile weapon is provided. The apparatus comprises an input for receiving information regarding measured velocity of a projectile in flight at least at one moment of time. The apparatus comprises an analyzer for determining the velocity and moment of time; an estimator for estimating value for a set of parameters; a calculator for using velocity, moment of time, estimated value and a zero-in angle of the sight to calculate a velocity of the projectile at the moment of time; and a comparator for comparing calculated velocity and measured velocity to determine whether a difference between the calculated and the measured velocity is less than a predetermined value. The apparatus is configured to repeat estimating, calculation of the velocity of the projectile and comparison with another estimated value for the set of parameters to model a trajectory of the projectile.

17 Claims, 4 Drawing Sheets

SIGHT

TECHNICAL FIELD

The specification relates to an apparatus, a method and a non-transitory computer program product for providing information for adjusting a sight of a projectile weapon.

BACKGROUND

Different kinds of projectile weapons exist such as a pistol, a rifle, a shotgun to mention just a few. The term projectile weapon includes inter alia firearms, which are designed to use expanded gas caused by combustion of explosive material to propel a projectile, and air guns in which a projectile is propelled by gas (e.g. air) pressurization. The term gun has also been used to refer to projectile weapons for propelling projectiles. This specification mainly concentrates to such projectile weapons which usually have a sight or a sight is attached near the projectile weapon. Rifles and shotguns are examples of such projectile weapons.

In industry, a large variety of projectile weapons is manufactured. Sights are usually mounted on a projectile weapon, which projectile weapon is able to fire projectiles at a target.

Shooting can take a place from a fixed shooting distance. The sight can be adjusted by taken into account, for example, the shooting distance, air pressure, air temperature, wind, Coriolis, and ballistic properties of the projectile.

SUMMARY

It is an aim of this specification to disclose a method, an apparatus and a non-transitory computer program product for providing information for adjusting a sight of a projectile weapon and/or for modelling the flight path of the projectile.

Aspects of the invention are characterized by what is stated in the independent claims. Preferred embodiments are disclosed in the dependent claims. These and other embodiments are disclosed in the description and figures.

According to the solution according to an example embodiment, a calibration process may be performed to obtain correct parameters for adjusting the sight of the projectile weapon. The calibration may be performed so that a projectile (also called a bullet) is fired by the projectile weapon towards a target at a known distance and keeping the target in the view of the sight. Then the point at which the projectile hits the target is checked and if the point deviates from the aimed point, the angle of the sight is adjusted to compensate the difference. This procedure may be repeated several times until a desired accuracy has been obtained. After the calibration procedure has been completed, then a scope angle (also known as a zero-in angle) can be determined. This may be performed by calculating the angle of the projectile weapon by which a flight path of the projectile crosses a center line of the sight at a desired distance. When the scope angle has been calculated, substantially all external factors can be varied, such as an initial velocity of the projectile, shape of the projectile, wind, air pressure, etc.

According to a first aspect there is provided an apparatus for providing information for adjusting a sight of a projectile weapon, the apparatus comprising an input for receiving information regarding a measured velocity of a projectile in flight at least at one moment of time, which projectile has been fired from a projectile weapon; an analyzer for determining the velocity and the moment of time; an estimator for estimating a value for a set of parameters; a calculator for using the velocity, the moment of time, the estimated value and a zero-in angle of the sight to calculate a velocity of the projectile at the moment of time; and a comparator for comparing the calculated velocity and the measured velocity to determine whether a difference between the calculated velocity and the measured velocity is less than a predetermined value; wherein the apparatus is configured to repeat the estimating, the calculation of the velocity of the projectile and the comparison with another estimated value for the set of parameters to model a trajectory of the projectile.

According to an embodiment the apparatus comprises an adjustment calculator for determining adjustment information for adjusting the sight of the projectile weapon based on the modelled trajectory and a current angle difference between a barrel axis of the projectile weapon and the sight.

According to a second aspect there is provided an apparatus for providing information for adjusting a sight of a projectile weapon, the apparatus comprising at least one processor and at least one memory, said at least one memory comprising computer code when executed by at least one of the at least one processor causes the apparatus to receive information of frequency or wavelength of a signal transmitted toward a projectile in flight, which projectile has been fired from a projectile weapon; receive information of frequency or wavelength of a signal reflected from the projectile in flight; determine a difference of frequency or wavelength between the transmitted signal and the received signal; use the difference of frequency or wavelength to determine a velocity and acceleration of the projectile; model a flight path of the projectile based on the determined velocity and acceleration of the projectile; and determine adjustment information for adjusting the sight of the projectile weapon based on the modelled flight path and a current angle difference between a barrel axis of the projectile weapon and the sight.

According to a third aspect there is provided a device for providing information for adjusting a sight of a projectile weapon, the device comprising a transmitter for transmitting a signal toward a projectile in flight, which projectile has been fired from a projectile weapon; a receiver for receiving a signal reflected from the projectile in flight; a signal analyzer for determining a difference of frequency or wavelength between the transmitted signal and the received signal; a velocity calculator for using the difference of frequency to determine a velocity and acceleration of the projectile; a modeler for modelling a flight path of the projectile based on the determined velocity and acceleration of the projectile; and an adjustment calculator for determining adjustment information for adjusting the sight of the projectile weapon based on the modelled flight path and a current angle difference between a barrel axis of the projectile weapon and the sight.

According to a fourth aspect there is provided non-transitory computer-readable medium storing a program for providing information for adjusting a sight of a projectile weapon including instructions that, when executed by at least one processor causes an apparatus to receive information of frequency or wavelength of a signal transmitted toward a projectile in flight, which projectile has been fired from a projectile weapon; receive information of frequency or wavelength of a signal reflected from the projectile in flight; determine a difference of frequency or wavelength between the transmitted signal and the received signal; use the difference of frequency or wavelength to determine a velocity and acceleration of the projectile; model a flight path of the projectile based on the determined velocity and acceleration of the projectile; determine adjustment information for adjusting the sight of the projectile weapon based on the modelled flight path and a current angle difference between a barrel axis of the projectile weapon and the sight.

According to a fifth aspect there is provided a method for providing information for adjusting a sight of a projectile weapon, the method comprising receiving information regarding a measured velocity of a projectile in flight at least at one moment of time, which projectile has been fired from a projectile weapon; determining the velocity and the moment of time; estimating a value for a set of parameters; using the velocity, the moment of time, the estimated value and a zero-in angle of the sight to calculate a velocity of the projectile at the moment of time; comparing the calculated velocity and the measured velocity to determine whether a difference between the calculated velocity and the measured velocity is less than a predetermined value; and repeating the estimating, the calculation of the velocity of the projectile and the comparison with another estimated value for the set of parameters to model a trajectory of the projectile.

BRIEF DESCRIPTION OF THE DRAWINGS

In the following, the invention will be described in more detail with reference to the appended drawings, in which.

Figure 1:
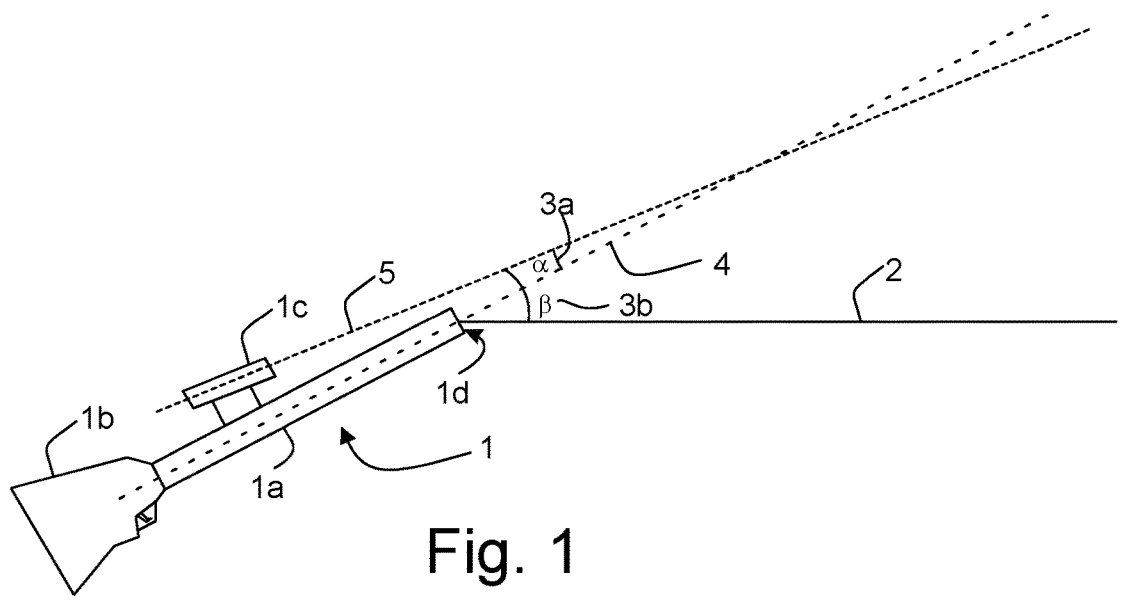
FIG. 1 illustrates an example of an arrangement including a projectile weapon firing a projectile.

The figures are schematic and are intended to illustrate the general principles of the disclosed solution. Therefore, the illustrations in the Figures are not necessarily in scale or suggestive of precise layout of system components.

DETAILED DESCRIPTION

The solution is described in the following in more detail with reference to some embodiments, which shall not be regarded as limiting.

In the text, references are made to the figures with the following numerals and denotations:
1 projectile weapon,
1a barrel of the projectile weapon,
1b stock of the projectile weapon,
1c sight,
2 horizontal plane,
3a an angle α between a line of sight to the target and a barrel axis of the projectile weapon,
3b an elevation angle β between a line of sight to the target and a horizontal plane,
4 barrel axis of the projectile weapon,
5 line of sight,
6 trajectory,
7 chronograph,
7 controller,
7 memory,
7 interface,
7 display,
8 stronger field of radiation,
9 weaker field of radiation,
10 exit point of radiation,
11 measurement (transmitted and reflected) signals,
12 projectile,
13 radar,
60 method step,
61 method step,
62 method step,
63 method step,
64 method step,
65 method step,
66 method step,
67 method step,
68 method step.

Terms and Standards

For the purpose of the present description and the claims, unless otherwise indicated, all ranges include any combination of the maximum and minimum points disclosed and include any intermediate ranges therein, which may or may not be specifically enumerated herein.

The embodiments and examples recited in the claims and in the description are mutually freely combinable unless otherwise explicitly stated.

In this specification, the term "comprising" may be used as an open term, but it also comprises the closed term "consisting of". Thus, unless otherwise indicated, the word "comprising" can be read as "comprising or consisting of".

The term "Doppler effect" is known by a person skilled in the art. The doppler effect is based on a phenomenon where frequency of a wave changes when the source of the wave and the observer are in relative motion. As the target moves toward or away from a radar, the frequency of the reflected signal changes due to the Doppler effect. The doppler effect is discussed below.

The term "radar system" particularly refers to Continuous Wave radar, i.e., CW radar.

The terms "Continuous Wave radar" and "CW radar" refer to a radar system that can transmit a constant-frequency radio wave and (typically simultaneously) listen for the return signal or echo from a target. The primary purpose of CW radar can be to detect and measure the relative velocity of a target, typically using the Doppler effect.

The term "ODE" refers to ordinary differential equations.

The term "Fourier Transform" is discussed below.

The "Drag coefficient" depends on a type and velocity of a projectile and is known by a person skilled in the art. The drag coefficient value may be given for each projectile by a manufacturer of the projectile. The Drag coefficient is further discussed later in this specification.

Projectile Weapon

A projectile weapon has a barrel 1a, a stock 1b, and may also have a sight 1c, as is illustrated in FIG. 1. The sight is, for example, a telescopic sight but also other kinds of sights may be used with the projectile weapon. The sight 1c can be an optical sighting device for providing a point of aim.

The sight can have several controls, such as rings, for adjusting the sight, e.g., depending on a projectile and a location of a target.

FIG. 1 also illustrates an elevation angle 3b (β) between the line of sight 5 to the target and a horizontal plane 2. As it can be seen from FIG. 1, the elevation angle β between the line of sight 5 to the target and the horizontal plane 2 is slightly different from the angle between the centerline 4 of the bore and the horizontal plane 2, because the sight 1c is slightly above the barrel 1a of the projectile weapon 1.

The sight 1c can have an elevation compensation, such as a knob or other element, e.g. a ring, for elevation compensations. The elevation compensation can be used for compensating a drop of projectile, which depends, e.g., a distance to a target. Thus, the elevation compensation can be used for adjusting a sight of a projectile weapon for firing projectiles to a target.

The sight may further have e.g. a parallax compensation, such as a knob or other element, e.g. a ring, for making parallax adjustments. Furthermore, the sight can have a windage control for adjusting a horizontal deviation.

The sight 1c can also have a reticle, which may be implemented as a from crosshair to some other solutions. In addition to the crosshair, the reticle may also have some target marks above, below, to the left and/or to the right of a center of the crosshair lines. These target marks may help to adjust the sight during a setup process.

Projectiles

Different types of projectiles 12 may have different velocity and different location in time from the moment of firing the projectile. The velocity of a projectile may be dependent, e.g., on dimensions of the projectile. The velocity of a projectile may be dependent on a shape of a projectile, especially on a shape of a cross section of the projectile in the longitudinal direction and/or in the direction perpendicular to the longitudinal direction of the projectile. Further, all dimensions can be relative to the caliper of the projectile.

A manufacturer of a projectile has usually listed some properties of the projectile, e.g. on a package including the projectiles. Therefore, a person using the projectile typically knows the caliper, the type, the weight (g, gr) and the velocity (m/s, fps) of each projectile.

However, the manufacturer can be unable to disclose an exact flight path of projectiles as the flight path not only depends on the projectile but also on many other things.

Ballistic Coefficient (BC) and Gx Projectiles

Figure 3:
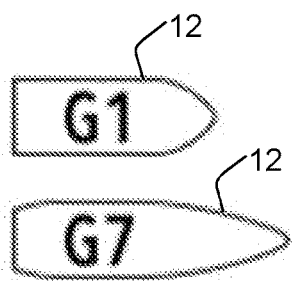
FIG. 3 illustrates some examples of projectiles.

Ballistic coefficient (BC) and Gx projectiles (x being a number defining a type of the projectile, such as G1 or G7) are terms known by a person skilled in the field of ballistics, studying of motion and behavior of projectiles. Both terms are used in understanding and predicting a projectile's flight characteristics, performance, and accuracy at various ranges. FIG. 3 illustrates examples of a longitudinal cross section of projectiles 12 having ballistic properties corresponding to G1 (the upper projectile in FIG. 3) or G7 (the lower projectile in FIG. 3).

Ballistic Coefficient (BC) is a dimensionless number that represents a projectile's ability to overcome air resistance during flight. It is a measure of how streamlined and efficient a projectile is at maintaining its velocity as it travels through the air.

The higher the BC is, the better the projectile can retain its velocity and resist the effects of wind drift and drop due to gravity.

BC can be calculated using the following equation:

$$BC = \text{sectional density}/\text{form factor} \qquad \text{Equation 1}$$

where

"sectional density" is calculated as the mass of the projectile divided by its cross-sectional area, "form factor" is a dimensionless shape factor which relates the projectile's drag to that of a reference projectile.

A higher Ballistic Coefficient means that the projectile will have less drag and maintain a flatter trajectory, hence, making it more accurate and effective at longer ranges.

The Gx projectiles, wherein x is a number defining type of the projectile, represent a specific bullet shape which can be used as a reference model in ballistics.

It is important to note that, in addition to G1, there are other reference projectile models, such as G2, G5, G7, and others, which represent different bullet shapes. The choice of reference model depends on the specific bullet shape being analyzed, as some models may provide a more accurate representation of the projectile's performance than e.g. the G1 model.

For example, the G1 model is based on a flat-based, ogive-nosed bullet design, which was the standard shape for military projectiles during World War I. The G1 shape is widely used as a reference in calculating ballistic coefficients because it is a simple and well-documented shape that is well known.

When calculating the BC of a projectile, the drag coefficient may be compared to that of the Gx reference projectile. The Gx model is preferably selected depending on the bullet shape to be analyzed so that the selected Gx shape is as close the shape of the bullet to be analyzed as possible. The resulting value indicates how the projectile's performance compares to the standard Gx shape.

Thus, the ballistic coefficient (BC) is a measure of a projectile's efficiency in overcoming air resistance, while the Gx projectile is a reference model used for comparison when calculating the BC.

Drag Coefficient (Cd)

The drag coefficient (Cd) is a dimensionless number that represents the amount of aerodynamic drag a projectile experiences as it moves through the air. Drag is the force that opposes the motion of an object through air. The drag coefficient is an important factor in determining the flight characteristics, performance, and accuracy of a projectile.

The drag coefficient depends on, e.g., the projectile's shape, surface roughness, and the flow conditions, such as the Reynolds number (i.e., a dimensionless quantity describing the ratio of inertial forces to viscous forces in a fluid).

A lower drag coefficient means that the projectile is more aerodynamically efficient, experiencing less drag as it moves through the air. This leads to a flatter trajectory, less wind drift, and a higher retained velocity, which translates into better long-range performance and accuracy.

The drag coefficient is often used in conjunction with the ballistic coefficient (BC). As discussed, the drag coefficient is a measure of a projectile's ability to overcome air resistance during flight.

As discussed, the drag coefficient can be calculated using the drag coefficient of the projectile relative to a reference projectile (such as the selected Gx model). To calculate the drag force acting on a projectile, the drag coefficient (which can be calculated using the Equation 1, for example) can be used in the following equation:

$$FD = 0.5 * Cd * \rho * A * V^2 \qquad \text{Equation 2}$$

where

"FD" is drag force.

"Cd" is the drag coefficient.

"ρ" (rho) is the air density.

"A" is the projectile's reference area (referring to a frontal area of the projectile), "V" is the projectile's velocity.

By understanding the drag coefficient and its influence on a projectile's flight, a person skilled in the art can design more efficient projectiles and develop more accurate firing solutions for different shooting scenarios.

MOA (Minute of Angle) and Mil-Dot (Short for Milliradian Dot)

MOA (Minute of Angle) and Mil-Dot (short for Milliradian Dot) are angular units of measurement used in the field of ballistics, particularly in long-range shooting and optics.

MOA (Minute of Angle) and Mil-Dot (short for Milliradian Dot) are used to describe the size of an object or target in the field of view, make adjustments to a rifle scope, and estimate range as follows:

MOA (Minute of Angle):

A minute of angle (MOA) is an angular unit of measurement equal to 1/60th of a degree. Since there are 360 degrees in a circle, there are 21,600 minutes of angle in a full circle. MOA is used to describe the size of an object or target, as well as to make adjustments in a rifle scope.

In practical terms, 1 MOA at 100 yards is approximately equal to 1.047 inches, but it's often rounded down to 1 inch for simplicity. This means that if a rifle scope has adjustments in MOA, each click (adjustment) would move the point of impact by 1 inch at 100 yards, 2 inches at 200 yards, 3 inches at 300 yards, and so on.

Mil-Dot (Milliradian Dot):

Mil-Dot is a system that uses milliradians (mils) as an angular unit of measurement. A milliradian is equal to 1/1000th of a radian, and there are 2π (approximately 6.283) radians in a circle, which equates to 6,283 milliradians in a full circle. Mil-Dot is commonly used in military and tactical scopes.

A Mil-Dot reticle is a type of scope reticle (crosshair pattern) that features dots or markings spaced at uniform milliradian intervals along the horizontal and vertical axes. These dots can be used to estimate the range to a target, holdover for bullet drop compensation, and make windage and elevation adjustments.

In practical terms, 1 mil at 1000 meters is approximately equal to 1 meter, or at 100 meters, it's approximately equal to 10 centimeters. If a rifle scope has adjustments in mils, each click (adjustment) would move the point of impact by 1/10th of a mil, which is 1 centimeter at 100 meters or 0.1 meters at 1000 meters.

Thus, MOA and Mil-Dot are angular units of measurement used in ballistics and optics to describe target size, make adjustments to a rifle scope, and estimate range. MOA is based on minutes of angle, while Mil-Dot is based on milliradians and often features a reticle with uniformly spaced dots or markings.

The solution according to this specification can be used for both units or for some other units.

Doppler Effect

Doppler Effect is a phenomenon in which the frequency and wavelength of a wave change due to the relative motion between the wave source and the observer. It applies to all types of waves, including sound, light, and other electromagnetic waves like radio waves, which are used in radar systems.

Radar is an acronym for "Radio Detection And Ranging". It is a system that uses radio waves to detect and locate objects, determine their velocity, and track their movement. The Doppler Shift can play a crucial role in some radar systems, particularly in Doppler radar, which is used to measure the velocity of a target.

In a Doppler radar system, a transmitter can emit radio waves that travel through the air and bounce off an object, such as an airplane, a car, or a weather phenomenon like a storm. The reflected radio waves can be then received by the radar's receiver. If the object is stationary, the frequency of the emitted and received radio waves will be the same. However, if the object is moving, the frequency of the reflected radio waves will be shifted due to the Doppler Effect.

When the object is moving toward the radar, the reflected radio waves will have a higher frequency (compressed waves) compared to the transmitted waves. Conversely, when the object is moving away from the radar, the reflected radio waves will have a lower frequency (stretched waves).

By analyzing the frequency shift between the transmitted and received radio waves, the radar system can calculate the object's velocity and direction of movement.

Doppler radar is widely used in various applications, such as weather forecasting (to track the movement of storms and precipitation), air traffic control (to monitor the velocity and position of aircraft), and law enforcement (to measure vehicle velocities for traffic enforcement).

The radar system according to this specification is preferably the doppler radar system. The doppler radar system can be used for determining projectile's velocity.

Preferably, when determining projectile's velocity, a radar system is next to a projectile weapon, such as within 2 meters from the projectile weapon.

The projectile weapon to be calibrated can be used for shooting a projectile while the radar system is determining the projectile's velocity.

Fourier Transform

Fourier Transform is a mathematical technique used to decompose a signal into its constituent frequencies. It is known by a person skilled in signal processing and can be applied to analyze the Doppler Effect.

When dealing with the Doppler Effect, frequency shifts in signals may need to be analyzed, such as sound waves, electromagnetic waves, or other waveforms.

The Fourier Transform can allow to convert the time-domain representation of these signals (i.e., the signal's amplitude as a function of time) into a frequency-domain representation (i.e., the signal's amplitude as a function of frequency). This transformation makes it easier to identify and analyze the frequency shifts caused by the Doppler Effect.

The Fourier Transform can be used as follows:
1. Acquire the signal from a projectile by using a radar system, wherein the signal will contain information about the projectile and its relative motion to the radar system.
2. Apply the Fourier Transform by converting the time-domain signal into its frequency-domain representation using the Fourier Transform. This step will reveal the constituent frequencies of the signal and their corresponding amplitudes.
3. Identify the Doppler Shift by examining the frequency-domain representation of the signal to identify any frequency shifts caused by the Doppler Effect. The shifts will be evident as peaks or changes in the amplitude of specific frequencies, depending on whether the projectile is moving toward or away from the radar system. Preferably, the projectile is moving away from the radar system.

4. Analyze the results by using the identified frequency shifts to determine the relative velocity and direction of the projectile's motion. This information can be used for tracking projectiles in the radar system.

Thus, the Fourier Transform can be used for analyzing the Doppler Effect. It helps to decompose complex signals into their constituent frequencies, making it easier to identify and analyze the frequency shifts caused by the Doppler Effect and, ultimately, extract valuable information about the relative motion of the projectile and radar system.

Euler Method and Modified Euler Method for Solving the Equations of Motion

The Euler method is a simple, first-order numerical method for solving ordinary differential equations (ODEs) with given initial conditions. The Euler method is less accurate than higher-order methods, such as the 4th order Runge-Kutta method (discussed below), but it is straightforward to understand and implement.

Given an initial value problem (IVP) of the form:

$$dy/dt = f(t, y) \quad y(t0) = y0$$

where f(t, y) is a known function of the independent variable t and the dependent variable y, the goal is to find y(t) for some later time.

The Euler method can be used as follows:
1. Divide the integration interval into N small steps of size h: h=(t_final−t0)/N
2. Initialize t=t0 and y=y0
3. For each step from 1 to N, perform the following calculations:
   a. Calculate the slope at the current point (t, y) using the function f(t, y): slope=f(t, y)
   b. Update the dependent variable (y) and independent variable (t) for the next step: y=y+h*slope t=t+h
4. After completing all N steps, the approximate value of y(t_final) is the value of y.

The main limitation of the Euler method is that it's not very accurate, especially when the step size (h) is large. The method's accuracy can be improved by reducing the step size, but this increases the number of steps and thus the computational cost. For problems that require higher accuracy or more stability, other numerical methods like the 4th order Runge-Kutta method or the family of implicit methods are typically preferred.

To account for air resistance in ballistic calculations, you can use the modified Euler method for solving the equations of motion. The formula requires accounting for drag force, which is influenced by air resistance.

The trajectory of a projectile can be determined as follows:
1. Define the constants and initial conditions:
   m: mass of the projectile (kg).
   g: acceleration due to gravity (9.81 m/s$^2$).
   Cd: drag coefficient (dimensionless, typically around 0.5 for a sphere).
   A: cross-sectional area of the projectile (m$^2$) in the direction perpendicular to the direction of flight of the projectile.
   ρ: air density (kg/m$^3$, approximately 1.225 kg/m$^3$ at sea level and 20° C.)
   vi: initial velocity of the projectile (m/s).
   θ: launch angle (degrees).
   BC: ballistic coefficient.
   w: wind.
   X: other components affecting the flight of the projectile
2. Calculate the drag force constant, k:

$$k = 0.5 * Cd * A * \rho / m$$

3. Convert the launch angle to radians:

$$\theta\_rad = \theta * (\pi/180)$$

4. Determine the initial velocity components:

$$vxi = vi * \cos(\theta\_rad) \quad vyi = vi * \sin(\theta\_rad)$$

5. Use the modified Euler method to solve the equations of motion. For each time step, update the projectile's position (x, y) and velocity (vx, vy) as follows:
   Calculate the drag force components:

$$Fdx = -k*vx*sqrt(vx^2 + vy^2) \quad Fdy = -k*vy*sqrt(vx^2 + vy^2) - m*g$$

Update the velocity components:

$$vx = vx + Fdx * \Delta t \quad vy = vy + Fdy * \Delta t$$

Update the position coordinates:

$$x = x + vx * \Delta t \quad y = y + vy * \Delta t$$

6. Repeat step 5 for each time step until the projectile reaches the ground (y<=0).

Note that the modified Euler method is a numerical approximation, and the accuracy of the results depends on the size of the time step, Δt. Smaller time steps will generally provide more accurate results, but they will also require more calculations, i.e., they make take more time and/or need a better processor.

4th Order Runge-Kutta Integrator

The 4th order Runge-Kutta integrator is a widely used numerical method for solving ordinary differential equations (ODEs).

The 4th order Runge-Kutta integrator provides an approximation of the solution to an ODE with higher accuracy than methods like Euler's method or the midpoint method.

The 4th order Runge-Kutta method is also known as RK4 or the "classical Runge-Kutta method".

Given an initial value problem (IVP) of the form:

$$dy/dt = f(t, y) \quad y(t0) = y0$$

where
"f(t, y)" is a known function of the independent variable t and the dependent variable y, the goal is to find y(t) for some later time.

The 4th order Runge-Kutta method can proceed as follows:
1. Divide the integration interval into N small steps of size h: h=(t_final−t0)/N
2. Initialize t=t0 and y=y0
3. For each step from 1 to N, perform the following calculations:
   a. Calculate the first estimate (k1): k1=h*f(t, y)
   b. Calculate the second estimate (k2): k2=h*f(t+0.5*h, y+0.5*k1)
   c. Calculate the third estimate (k3): k3=h*f(t+0.5*h, y+0.5*k2)
   d. Calculate the fourth estimate (k4): k4=h*f(t+h, y+k3)
   e. Update the dependent variable (y) and independent variable (t) for the next step: y=y+(⅙)*(k1+2*k2+2*k3+k4) t=t+h
4. After completing all N steps, the approximate value of y(t_final) is the value of y.

The 4th order Runge-Kutta method is preferably used for adjusting the sight because it provides a good balance between accuracy and computational complexity. It is particularly well-suited for solving problems relating to the velocity of projectiles in time where the differential equations involve time-varying processes.

Differential Equation

The differential equations describing the motion of a projectile under the influence of gravity and air resistance can be derived from Newton's second law of motion, F=ma.

For a projectile with mass m, the equations are given in the x (horizontal) and y (vertical) components.

First, variables can be determined as follows:
x(t): horizontal position as a function of time (m).
y(t): vertical position as a function of time (m).
vx(t): horizontal velocity as a function of time (m/s).
vy(t): vertical velocity as a function of time (m/s)
m: mass of the projectile (kg)
g: acceleration due to gravity (9.81 m/s$^2$)
Cd: drag coefficient (dimensionless)
A: cross-sectional area of the projectile (m$^2$)
ρ: air density (kg/m$^3$)

The drag force, Fd, acting on the projectile due to air resistance can be defined as $$Fd = 0.5 * Cd * A * \rho * v^2,$$

where v is the magnitude of the velocity vector:

$$v = sqrt(vx^2 + vy^2)$$

The horizontal and vertical components of the drag force are:

$$Fdx = Fd * (vx/v) = -k * vx * sqrt(vx^2 + vy^2)$$
$$Fdy = Fd * (vy/v) = -k * vy * sqrt(vx^2 + vy^2)$$
where $k = 0.5 * Cd * A * \rho/m$.

Now, apply Newton's second law in the x and y directions:

$$m * ax = Fdx \quad m * ay = Fdy - m * g$$

Divide both sides by m:

$$ax = -k * vx * sqrt(vx^2 + vy^2) \quad ay = -k * vy * sqrt(vx^2 + vy^2) - g$$

Since acceleration is the derivative of velocity with respect to time:

$$dvx/dt = -k * vx * sqrt(vx^2 + vy^2) \quad dvy/dt = -k * vy * sqrt(vx^2 + vy^2) - g$$

These two first-order, coupled, non-linear ordinary differential equations describe the motion of a projectile under the influence of gravity and air resistance:

$$d[vx, vy]/dt = [-k * vx * sqrt(vx^2 + vy^2), -k * vy * sqrt(vx^2 + vy^2) - g]$$

These equations can be solved numerically using methods like the Euler method or, preferably, the Runge-Kutta method described above.

Zero-In Range and Zero-In Angle and a Ballistic Calculator Using the Zero-in Range and/or the Zero-In Angle A ballistic calculator is a tool that calculates the trajectory of a projectile for long-range shooting or ballistics analysis. It may use various inputs, such as bullet characteristics, shooting conditions, and atmospheric data, to provide shooters with estimates of where the projectile will impact the target.

Zero-in range and zero-in angle are two inputs in these calculations.

Figure 2:
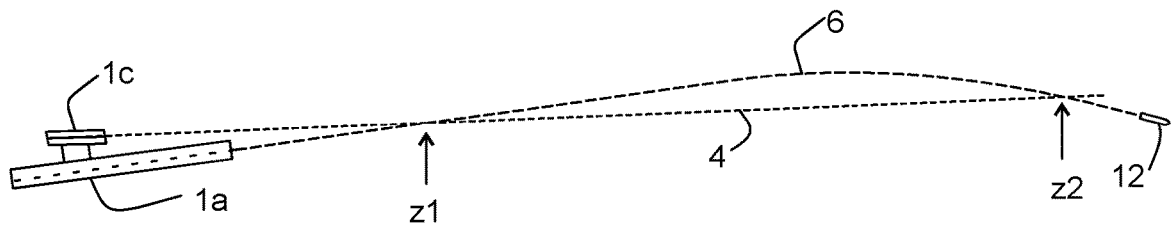
FIG. 2 illustrates a relationship between a line-of-sight and a path of a projectile to determine a zero-in range.

The zero-in range (also known as sight-in range or zero range) is the distance at which the shooter has adjusted their projectile weapon's sights 1c or scope so that the point of aim (POA) coincides with the point of impact (POI) for a specific ammunition load. At this distance, the bullet's trajectory crosses the line of sight 5 for the first time. See FIG. 2, point z1 of the bullet's trajectory 6. As the bullet 12 continues to travel, it will rise above the line of sight 5, reach its peak, and then drop back down to intersect the line of sight 5 again at a farther distance (often referred to as the "second zero" and illustrated with the location z2 in FIG. 2). The zero-in range is typically measured in yards or meters and serves as a reference point for calculating bullet drop and wind drift at other distances.

The zero-in angle (also called as a scope angle in this specification) refers to the angle between the centerline 4 of the bore (the internal surface of the projectile weapon's barrel 1a) and the centerline of the scope or sights 1c. When sighting in a projectile weapon, the shooter adjusts the scope or sights 1c to align the point of aim with the expected point of impact at a specific distance. This alignment results in a zero-in angle α, which is the angular difference between the bore's axis and the scope's axis. The zero-in angle can be necessary for the ballistic calculator to account for the difference in the initial trajectory of the bullet relative to the line of sight when providing accurate trajectory predictions and adjustments for long-range shooting.

Thus, the zero-in range is the distance at which the shooter has adjusted their projectile weapon's sights or scope 1c to achieve an accurate point of impact measured from the projectile weapon, while the zero-in angle is the angular difference between the centerline of the bore and the centerline of the scope, which accounts for the initial trajectory of the bullet relative to the line of sight. In other words, the zero-in range is the distance from the projectile weapon at which the projectile's path (trajectory) crosses the centerline of the sight.

In most shooting scenarios, especially in hunting and competitive shooting, the primary concern is adjusting for the bullet's drop at a specific distance. Knowing the zero-in range can be crucial for making the necessary adjustments in elevation and windage on the scope or sights. The zero-in angle, while useful in certain ballistics analyses, may not be as directly relevant to the shooting process as the zero-in range.

Zeroing Procedure

Zeroing, also known as sighting-in, is the process of adjusting a projectile weapon's sights or optic to align the point of aim (POA) with the point of impact (POI) at a specific distance. This may ensure that the shooter can accurately hit their target at the desired range.

Zeroing procedure may involve the following steps:

1. Zero Distance

Choose a distance: Decide on the distance (z2 in FIG. 2) at which you want to zero your projectile weapon. This distance should be appropriate for the intended use of the projectile weapon, whether it's hunting, target shooting, or self-defense. Common zero distances are 25 yards, 50 yards, 100 yards, or even 200 yards, depending on the projectile weapon and its purpose.

2. Set Up a Target

Place a target at the chosen distance. The target should have clearly visible markings or a grid to help you measure your adjustments.

3. Stable Shooting Position

A stable shooting position should be used to minimize human error, such as a movement of a hand due to forces caused by firing the projectile weapon and to ensure consistency during the zeroing process.

4. Bore Sighting

This step may save time and ammunition. Bore sighting involves aligning the bore (barrel) of the projectile weapon with the target, then adjusting the sights or optic to match the bore alignment. This can be done visually with bolt-action rifles or using a laser bore sighter for other projectile weapons.

5. Firing a Shot

Fire a group of, for example, 3 to 5 shots at the target, aiming consistently at the center or a specific point. This may help you determine the average point of impact relative to your point of aim.

6. Analyzing the Fire Shot(s)

Inspect the target and determine the average point of impact of your shots. Measure the distance and direction from the point of aim to the average point of impact.

7. Adjusting the Sight

Based on the measurements taken in the previous step, adjust the sights or optic to move the point of impact towards the point of aim. Most sights and optics have adjustment knobs or screws with clearly marked increments (such as ¼ MOA or ½ MOA per click).

8. Repeating the Process

Fire another group of shots and analyze the results. Continue to make adjustments to the sights or optic until the point of impact coincides with the point of aim.

According to some embodiments, repeating is not needed.

9. Verify Zero

Once you've achieved the desired alignment between point of aim and point of impact, you may fire a final group of shots to confirm that the projectile weapon is zeroed correctly, i.e., the calibration procedure is performed.

Chronograph

Figure 7:
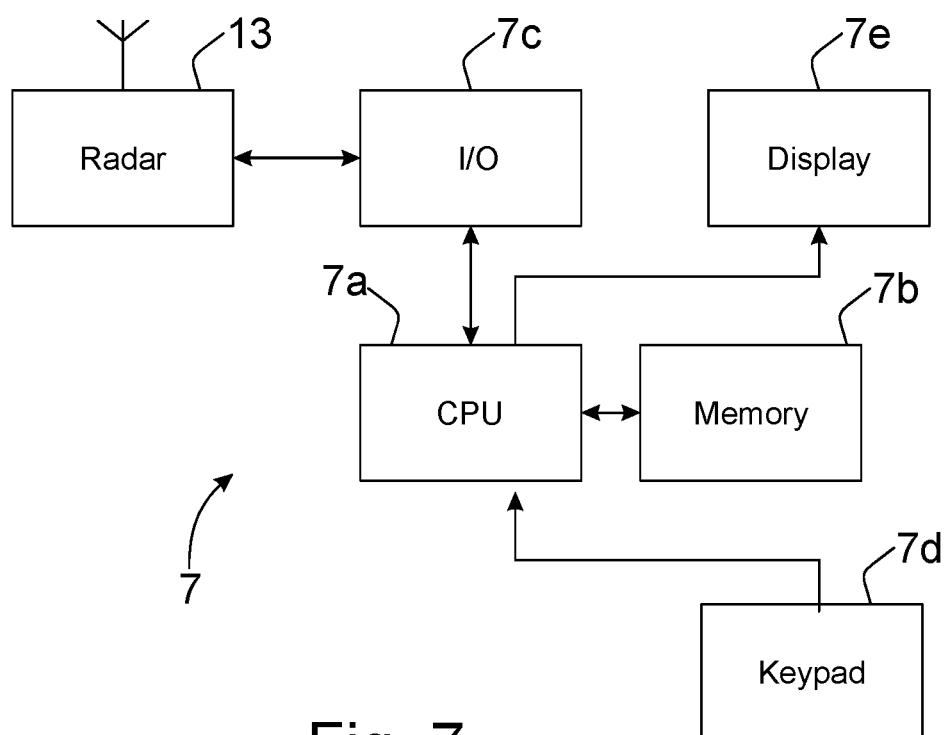
FIG. 7 is a simplified block diagram of an apparatus according to an embodiment.

FIG. 7 illustrates a simplified block diagram of the apparatus 7, which is also called as the chronograph in this specification, in accordance with an embodiment. There is one, two or more controllers 7a, such as a processor, microprosessor, microcontrolling unit, capable of executing computer code. The chronograph 7 also comprises one, two or more memory units 7b for storing data and/or computer code. An interface 7c is arranged for receiving information from the radar unit 13 and possibly from a keypad 7d. Such information from the radar unit 13 is the above-mentioned frequency and/or wavelength of the transmitted and the received signals, and/or the difference between the transmitted and the received signals. Information from the keypad 7d may be, for example, user instructions to control the operation of the apparatus 7. Results of the calculations may be shown to the user by a display 7e.

It should be noted that the example of FIG. 7 is only one example and may comprise further components than what is shown in FIG. 7.

Radar System

Radar system can comprise several components (not shown in the figures) that work together to transmit, receive, and process radio frequency (RF) signals. The radar system according to this specification can comprise at least some, preferably all, of the following components:

transmitter,
antenna,
low noise amplifier (LNA),
mixer,
local oscillator (LO),
Intermediate Frequency (IF) or Baseband Processing,
Digital Signal Processing (DSP), and
Data Presentation and Visualization.

These components can work together to form a complete Doppler radar system that is capable of detecting and measuring the velocity of target objects using the Doppler Effect.

The transmitter can generate and amplify radio frequency (RF) signals, which are then transmitted as radio waves. The transmitter can be a continuous wave (CW) or pulsed transmitter, depending on the radar system's design and application.

The antenna is responsible for radiating the RF signal from the transmitter into the atmosphere and receiving the reflected signals from the target object. In some radar systems, separate antennas are used for transmitting and receiving, while in others, a single antenna performs both functions using a duplexer or circulator.

The LNA is a key component in the receiver chain. It amplifies the weak received signals while minimizing the introduction of additional noise. This process ensures that the signal-to-noise ratio (SNR) is maintained and improves the radar system's sensitivity.

The mixer is a component that combines the received RF signal with a local oscillator (LO) signal. This process down converts the received signal to an intermediate frequency (IF) or baseband, which is more suitable for further processing and analysis.

The LO generates a stable reference frequency signal that is used in the mixer to down convert the received RF signal. The LO frequency is typically close to the transmitted signal frequency.

After the received signal has been downconverted, it undergoes further filtering, amplification, and processing at the IF or baseband stage. This processing may include analog or digital filtering, demodulation, and other signal conditioning techniques.

The digitized signal is processed using various digital signal processing techniques, such as Fast Fourier Transform (FFT), to extract information about the target object's velocity, range, and angle. The DSP may be performed by dedicated hardware or specialized software running on a general-purpose processor.

The processed data is often visualized in various formats, such as range-Doppler maps, velocity images, or other representations that provide useful information about the target object's position, velocity, and other characteristics.

Optionally, the radar system may further comprise Analog-to-Digital Converter (ADC).

The optional Analog-to-Digital Converter (ADC) can be used if the received signal is in analog form. In this case, it typically needs to be converted to a digital format, e.g. by using an ADC. This conversion allows for easier processing and analysis of the signal in subsequent stages.

In radar systems with a single antenna for both transmission and reception, a duplexer or circulator can be used to protect the sensitive receiver components from the high-power transmitted signal and to direct the received signal to the receiver.

Preferably, the radar system according to this specification is not using the Duplexer/Circulator.

Continuous Wave (CW) Radar

The solution according to this specification can use a radar system for calibrating a sight.

The radar system can be Continuous Wave radar system.

CW radar system typically continuously transmits a constant-frequency radio wave and simultaneously listens for the return signal or echo from a target.

CW radar system can be used to detect and measure a relative velocity of a target, typically using Doppler effect.

Continuous Wave radar system can have the following principle:
1. Transmission: The radar can continuously emit a constant-frequency radio wave, which travels through the atmosphere and strikes a target, such as an aircraft or a vehicle.
2. Reflection: When the radio wave hits the target, it gets reflected back toward the radar system.
3. Reception: The radar receiver can simultaneously listen for the reflected signal (echo) while continuously transmitting the original signal.
4. Doppler effect: As the target moves toward or away from the radar, the frequency of the reflected signal changes due to the Doppler effect. This is the phenomenon where the frequency of a wave changes when the source of the wave and the observer are in relative motion.
5. Processing: The radar system measures the frequency shift between the transmitted and received signals to determine the target's radial velocity (velocity towards or away from the radar). The frequency shift is directly proportional to the target's velocity.

It should be noted that CW radar may only be able measure the radial velocity of a target, not its range or position. To obtain range and position information, other types of radar systems, such as pulse radar, could be used.

It should be noted that although some of the embodiments above use frequencies of the transmitted/reflected signals in the determination of the velocity and acceleration, wavelength information can be used instead in the calculations as the frequency and wavelength of electromagnetic signals are interdependent.

Method

In the following a method for analyzing flight path 6 (trajectory) of a projectile 12 according to an embodiment will be described in more detail with reference to the projectile weapon of FIG. 1, the illustration of the trajectory of the projectile in FIG. 5 and the flow diagram of FIG. 6. This procedure may be called as ballistic calculation and an apparatus 7 performing the ballistic calculation may be called as a ballistic chronograph or a chronograph for short. The method and the apparatus 7 perform calculations of the trajectory 6 of the projectile 12, for example, for long-range shooting or ballistics analysis. Various inputs may be used, such as bullet characteristics, shooting conditions, and/or atmospheric data, to provide shooters with accurate estimates of where the projectile will impact the target. Zero-in range or zero-in angle are two possible inputs in these calculations.

Figure 5:
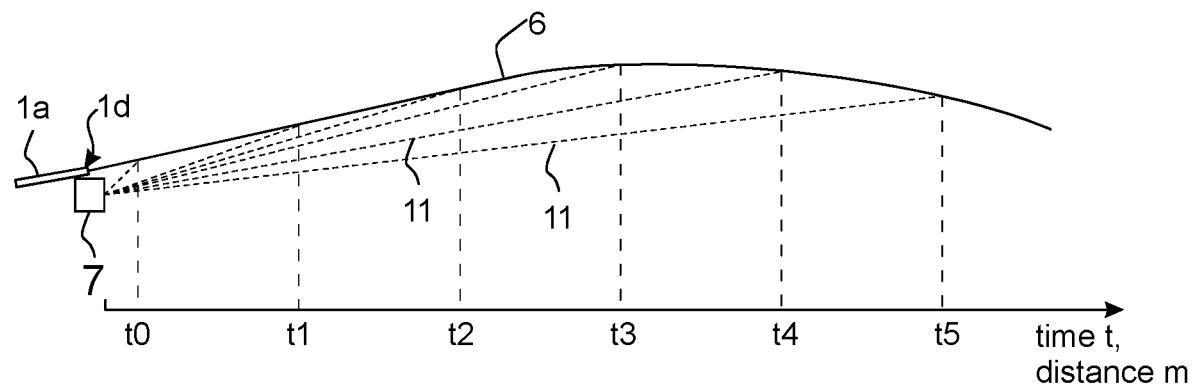
FIG. 5 illustrates an example of utilizing the radar in the determination of a flight path of a projectile fired from a projectile weapon.
Figure 6:
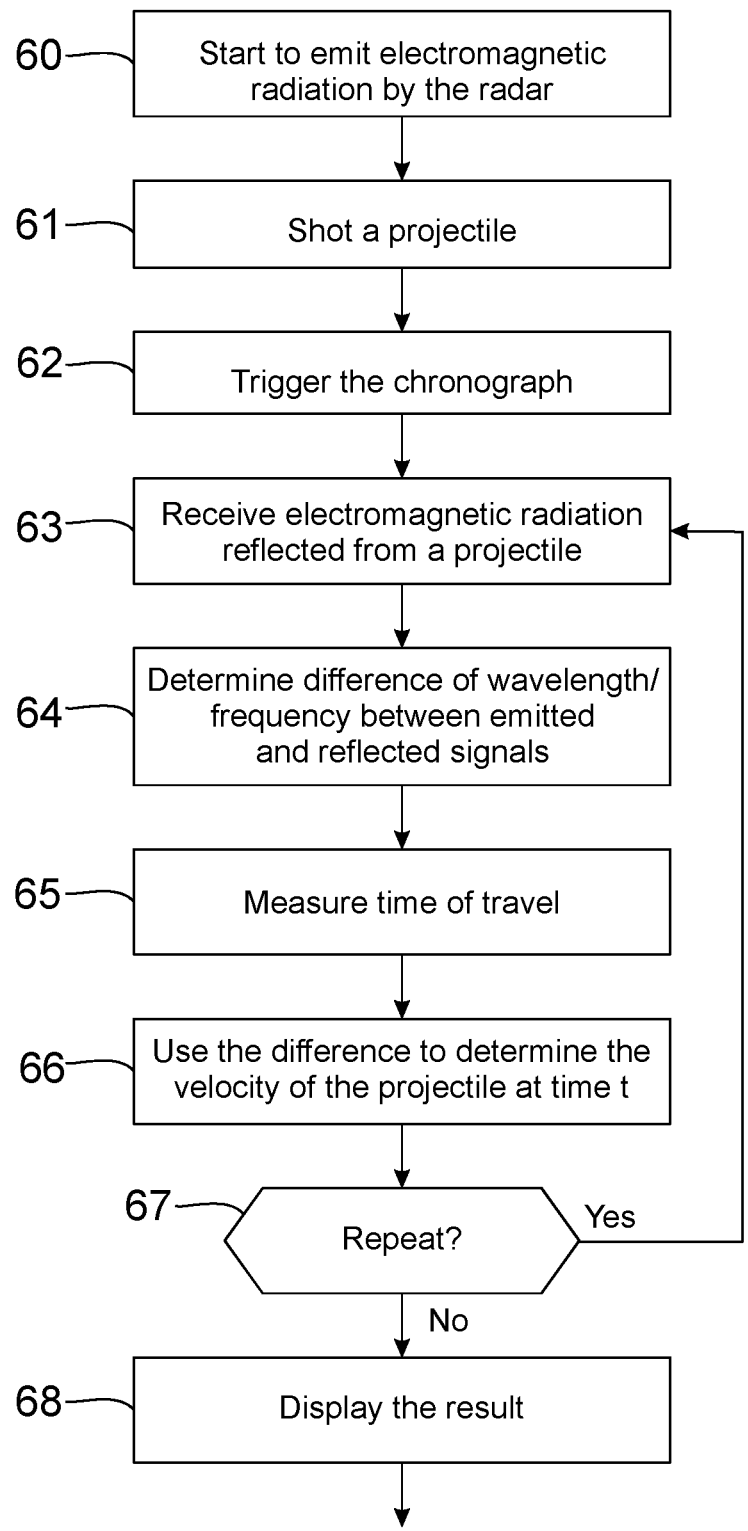
FIG. 6 is a flow diagram of a method according to an embodiment.

The chronograph 7 can be placed close to the barrel 1*b* on either side of the projectile weapon 1 as is illustrated in FIG. 5. Preferably, the chronograph 7 is placed behind or aside the muzzle 1*d*. The chronograph 7 comprises a radar (not shown) or another element capable of transmitting electromagnetic radiation and receiving electromagnetic radiation reflected from an object, in this case from a projectile.

Figure 4:
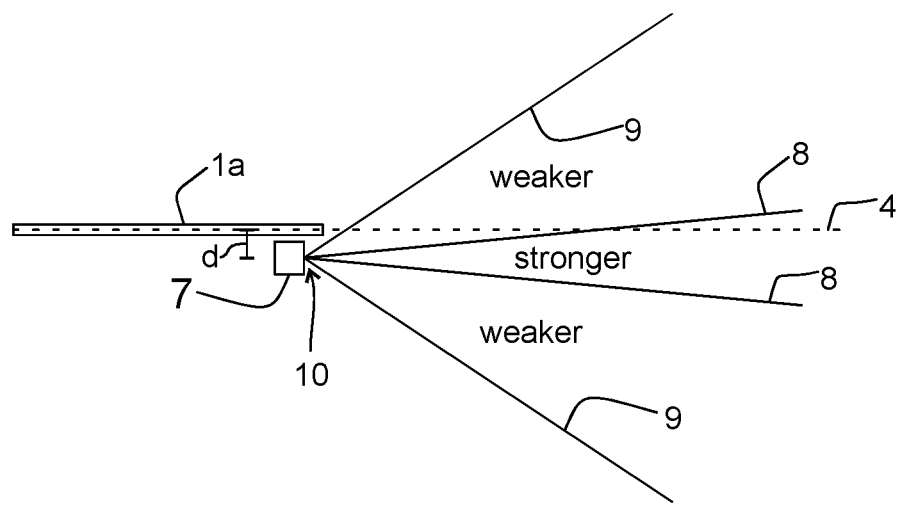
FIG. 4 illustrates radiation pattern of a radar in connection with a projectile weapon.

The radar generates electromagnetic radiation which is transmitted from the radar. Practically, the electromagnetic radiation radiates in a form of a cone and around a direction of radiation there may be a stronger field of radiation and farther away from the direction of radiation the field is weaker. A radar cone is a term used to describe the shape and direction of a radar beam. When a radar signal is transmitted, it spreads out in a cone shape, with the narrowest part of the cone at the point where the signal is emitted. As the signal travels farther from the source, the cone widens. This is illustrated in a simplified manner in FIG. 4, in which the stronger field is shown between the lines 8 and the weaker field is shown between the lines 9. It should be noted that the borders of the so-called stronger field and weaker field are not accurate but practically the strength of the field weakens in the direction perpendicular to the direction of radiation. The radar cone determines the area that the radar can detect and the direction in which it can detect objects.

It is assumed that the projectile weapon 1 has a sight 1*c*, which has been calibrated to obtain the scope angle (zero-in angle α), and that a projectile 12 has been fired by the projectile weapon 1. It is also assumed that the chronograph 7 has been started and the radar of the chronograph is transmitting electromagnetic radiation.

In accordance with an embodiment, the radar starts to emit 60 electromagnetic radiation towards the assumed trajectory of the projectile 12. Because the strong signal emitted by the radar is very narrow, aiming the projectile weapon should be carried out carefully for accurate enough results.

As an example of aiming the chronograph 7 in relation to the projectile weapon 1, if the chronograph is positioned on the right side of the projectile weapon, it may be better to rotate the chronograph 7 slightly counterclockwise to ensure that the transmitted radar signal crosses the projectile's trajectory. Respectively, if the chronograph is positioned on the left side of the projectile weapon, it may be better to rotate the chronograph 7 slightly clockwise to ensure that the transmitted radar signal crosses the projectile's trajectory.

Cosine error is a type of an error that can arise when measuring the velocity of projectiles with radar technology, and it is caused by the angle at which the radar beam hits the projectile. This angle is caused by the offset between a center line 4 of the muffle 1a and an exit point 10 of a laser beam from a radar. This offset is illustrated with line d in FIG. 4.

Further, the barrel of the projectile weapon can be positioned vertically between the top and bottom of the chronograph, with the middle being the optimal placement for better accuracy. The performance of the chronograph improves when it is positioned close to the barrel because this reduces the cosine error, which can affect the accuracy of the readings. By positioning the chronograph close to the barrel, the cosine error can be reduced, and the accuracy of the readings improved.

To perform the measurements, a projectile is shot by the projectile weapon at step 61. When the projectile enters the radar cone (indicated by the weak signal), the chronograph is triggered (step 62) and starts to make measurements.

When the radar signal is transmitted, it travels outward in a straight line at the speed of light. When the signal hits the projectile, at least a part of the signal is reflected, if the measurement has been set up properly. Such reflection occurs when the signal hits the surface of the projectile and bounces back toward the radar receiver. The amount of reflection that occurs depends on several factors, such as the size, shape, and composition of the projectile, as well as the angle at which the signal hits the projectile. Larger and smoother objects tend to reflect more of the signal, while smaller and rougher objects tend to reflect less. In addition, the angle at which the signal hits the projectile can affect the amount of reflection. A signal that hits the projectile at a steep angle will be more likely to bounce back toward the radar receiver than a signal that hits the projectile at a shallow angle.

The radar receives 63 electromagnetic radiation reflected back from the projectile 12. The radar 13 may determine 64 a difference of a frequency and/or a wavelength between the transmitted signal and the received signal and provide this information to the chronograph 7. The chronograph 7 measures 65 time of travel and uses the difference between the frequency/wavelength of the transmitted radiation and the received radiation to determine 66 the velocity of the projectile 12 at the moment of reflection t0 . . . t5.

This procedure may be repeated 67 several times so that a plurality of velocity and time measurements can be obtained. There may be some predetermined criteria how many times or how long the measurements are performed. These criteria may depend on the type of the projectile and/or parameters of the projectile, such as the drag coefficient. Another criterion may be the velocity so that when the measured velocity drops below a threshold, the repetition may be stopped and the result may be shown 68 to the user of the chronograph.

Measurements may be repeated, for example, more frequently than every 2 ms, every 2 ms, every 2.5 ms, every 3 ms or less frequently than every 3 ms. It should also be noted that the measurements need not be repeated at exactly the same intervals, but the moments of measurements may vary.

FIG. 5 illustrates several data points t0 . . . t5 at which the time and velocity measurements have been performed by the chronograph 7. The data point to represents the time when the projectile has been fired and detected by the chronograph 7. Data points t1 . . . t5 illustrate moments during the flight of the projectile 12 at which the measurements are performed.

At least some data points are selected at which the projectile 12 has been travelled long enough from the projectile weapon 1 so that the velocity of the projectile has been remarkably slowed down from the initial velocity. It should be noted that the selected data points should not be too far away from the projectile weapon to avoid effects caused by reduced accuracy. Namely, the longer the distance the less accurate the measurements may be. On the other hand, size of the projectiles may affect the accuracy of the measurements, e.g. so that for larger projectiles the data point may be selected further than for smaller projectiles.

The time tx the projectile has travelled from the initial moment and the velocity vx of the projectile at the selected data point are determined and used in the calculations.

When the time and velocity are known, these parameters are included in an equation to solve the drag force constant. This may be performed by an estimator of the chronograph e.g. as follows. The equation may be solved by using, for example, the Euler method from the equation $k=0.5*C_d*A*\rho/m$.

The value of k may be "guessed", i.e. an assumed value for k is obtained by selecting an assumed value for a variable X, which represents all unknown parameters. The drag coefficient Cd is known so the above equation can be written in the following form: $k=C_d*X$.

Then the equation is solved and checked whether the measured velocity of the projectile at time tx corresponds with the calculated velocity vx at the selected data point. This may be performed by a comparator of the chronograph 7, which compares the measured velocity and the calculated velocity and if the comparison indicates that the measured velocity and the calculated velocity are the same or almost the same (e.g. the difference is less than or equal to a threshold), it can be determined that the value obtained for the parameter X is correct. On the other hand, if the comparison indicates that the difference between the measured velocity and the calculated velocity is too large (e.g. the difference is larger than the threshold), then the value of X is changed and the calculation is performed again. This procedure may be repeated until a sufficient accuracy for the k has been obtained.

When the parameter k has been calculated and a launch angle and certain parameters related to the projectile and the environment are known, it is possible to model a flight path of the projectile. This may be performed by using some of the equations described earlier in this specification.

In other words, the calculations which utilize measured information, use ballistic equations to find values which fit well to represent the trajectory accurately enough.

The above-mentioned estimator and comparator may be implemented as computer code to be executed by the controller 7a of the chronograph 7.

Another option to determine the flight path from the calculations is to compare velocity and acceleration information with a predetermined curves of flight and when a closest curve has been found that curve can be used as an estimate of the flight path. One disadvantage of the curve fitting method may be that a huge number of curves may be needed, which have been predetermined using different projectile parameters.

In the following, some examples of the projectile and environment related parameters are mentioned:
  velocity and/or time from the radar,
  zero angle, gravity,
drag coefficient,
ballistic coefficients.

It should be noted that also some other properties of the projectile may affect to the aerodynamic drag of the projectile.

In the following a method according to another embodiment will be described. Also in this embodiment it is assumed that a projectile weapon 1 has a calibrated sight 2 and that a projectile 12 has been fired by the projectile weapon 1. This embodiment differs from the above-described embodiment in the sense that the radar or another device capable of transmitting electromagnetic signals towards the projectile and receiving electromagnetic signal reflected from the projectile does not provide information of the difference of frequency and/or wavelength between the transmitted signal and the received, reflected signal, but only information of the transmitted signal and the reflected signal. Therefore, frequency/wavelength difference determination is performed by the apparatus 7 as a part of the method. Hence, the method comprises receiving the information of the frequency/wavelength of the transmitted signal and the reflected signal. The apparatus 7 can then calculate the difference and based on the difference in the frequency/wavelength and the frequency/wavelength of the transmitted signal and/or the received signal, the velocity of the projectile 12 can be determined. When the velocity determination has been repeated two or more times and the timing of the repetitions (i.e. time differences between consecutive difference measurements) is known it is possible to calculate the acceleration of the projectile 12 at several time instances.

A method for adjusting a sight of a projectile weapon according to yet another embodiment comprises the following:

A projectile 12 is fired from the projectile weapon and a radar 13 transmits an electromagnetic signal towards the projectile 12. Information of the frequency of the transmitted signal is provided to an apparatus 7. The radar 13 receives an electromagnetic signal, which has been reflected from the projectile 12 and determines the frequency of the reflected signal. Information of the frequency of the reflected signal is provided to the apparatus. The apparatus then calculates a difference of the frequency of the transmitted signal and the frequency of the reflected signal. The apparatus uses the difference to determine the velocity of the projectile at the time of reflection.

The transmission and reception are repeated to obtain another pair of transmitted frequency information and received frequency information. This information may then be used to calculate the velocity of the projectile at the second time instant. The difference in the velocity can then be used to calculate the acceleration (deceleration) of the projectile between these two measurement time instants.

The above steps may be repeated to obtain a plurality of velocity, acceleration and location information, wherein a projectile path is modelled.

The modelled projectile path may then be used to adjust the position of the sight with respect to the barrel of the projectile weapon.

The solution according to this specification does not need a target during the ballistic calculations. For accurate results, the radar should have a clear (i.e. unobstructed) view at least 15 yards away, preferably there is not any obstacles in the path of the electromagnetic radiation within 25 yards from the radar, namely, any obstacles in the line of sight may affect the accuracy of the readings or cause the chronograph to fail to trigger correctly.

Once a shot has been taken, the results of the shot may be displayed.

In the following some examples will be provided.

There is provided an apparatus for adjusting a sight of a projectile weapon, the apparatus comprising:
an input for receiving information regarding a measured velocity of a projectile in flight at least at one moment of time, which projectile has been fired from a projectile weapon;
an analyzer for determining the velocity and the moment of time;
an estimator for estimating a value for a set of parameters;
a calculator for using the velocity, the moment of time, the estimated value and a zero-in angle of the sight to calculate a velocity of the projectile at the moment of time; and
a comparator for comparing the calculated velocity and the measured velocity to determine whether a difference between the calculated velocity and the measured velocity is less than a predetermined value;
wherein the apparatus is configured to repeat the estimating, the calculation of the velocity of the projectile and the comparison with another estimated value for the set of parameters to model a trajectory of the projectile.

In accordance with an embodiment the apparatus further comprises:
an adjustment calculator for determining adjustment information for adjusting the sight of the projectile weapon based on the modelled trajectory and a current angle difference between a barrel axis of the projectile weapon and the sight.

In accordance with an embodiment said modeler is configured to:
use one or more of the following parameters in the modelling of the flight path:
velocity and/or time from the radar,
zero angle,
gravity,
drag coefficient,
ballistic coefficients.

In accordance with an embodiment the apparatus is configured to:
determine the velocity of the projectile at a plurality of time instances;
determine the acceleration based on the plurality of time instances and time differences between the time instances.

In accordance with an embodiment said modeler is configured to:
perform curve fitting to find out which predetermined curve corresponds the determined velocity, acceleration and the projectile parameters.

In accordance with an embodiment the apparatus is configured to receive the information of frequency or wavelength of the transmitted signal and the information of frequency or wavelength of the reflected signal from a radar.

There is also provided an apparatus for adjusting a sight of a projectile weapon, the apparatus comprising at least one processor and at least one memory, said at least one memory comprising computer code when executed by at least one of the at least one processor causes the apparatus to:
receive information of frequency or wavelength of a signal transmitted toward a projectile in flight, which projectile has been fired from a projectile weapon;
receive information of frequency or wavelength of a signal reflected from the projectile in flight;

determine a difference of frequency or wavelength between the transmitted signal and the received signal;
use the difference of frequency or wavelength to determine a velocity and acceleration of the projectile;
model a flight path of the projectile based on the determined velocity and acceleration of the projectile;
determine adjustment information for adjusting the sight of the projectile weapon based on the modelled flight path and a current angle difference between a barrel axis of the projectile weapon and the sight.

In accordance with an embodiment said memory comprises computer code when executed by at least one of the at least one processor causes the apparatus to:
use one or more of the following parameters in the modelling of the flight path:
velocity and/or time from the radar,
zero angle,
gravity,
drag coefficient,
ballistic coefficients.

In accordance with an embodiment said memory comprises computer code when executed by at least one of the at least one processor causes the apparatus to:
determine the velocity of the projectile at a plurality of time instances;
determine the acceleration based on the plurality of time instances and time differences between the time instances.

In accordance with an embodiment said memory comprises computer code when executed by at least one of the at least one processor causes the apparatus to:
perform curve fitting to find out which predetermined curve corresponds the determined velocity, acceleration and the projectile parameters.

There is also provided a device for adjusting a sight of a projectile weapon, the device comprising:
a transmitter for transmitting a signal toward a projectile in flight, which projectile has been fired from a projectile weapon;
a receiver for receiving a signal reflected from the projectile in flight;
a signal analyzer for determining a difference of frequency or wavelength between the transmitted signal and the received signal;
a velocity calculator for using the difference of frequency to determine a velocity and acceleration of the projectile;
a modeler for modelling a flight path of the projectile based on the determined velocity and acceleration of the projectile;
an adjustment calculator for determining adjustment information for adjusting the sight of the projectile weapon based on the modelled flight path and a current angle difference between a barrel axis of the projectile weapon and the sight.

There is also provided a non-transitory computer-readable medium storing a program for adjusting a sight of a projectile weapon including instructions that, when executed by at least one processor causes an apparatus to:
receive information of frequency or wavelength of a signal transmitted toward a projectile in flight, which projectile has been fired from a projectile weapon;
receive information of frequency or wavelength of a signal reflected from the projectile in flight;
determine a difference of frequency or wavelength between the transmitted signal and the received signal;
use the difference of frequency or wavelength to determine a velocity and acceleration of the projectile;
model a flight path of the projectile based on the determined velocity and acceleration of the projectile;
determine adjustment information for adjusting the sight of the projectile weapon based on the modelled flight path and a current angle difference between a barrel axis of the projectile weapon and the sight.

There is also provided a method for adjusting a sight of a projectile weapon, the method comprising:
receiving information regarding a measured velocity of a projectile in flight at least at one moment of time, which projectile has been fired from a projectile weapon;
determining the velocity and the moment of time;
estimating a value for a set of parameters;
using the velocity, the moment of time, the estimated value and a zero-in angle of the sight to calculate a velocity of the projectile at the moment of time;
comparing the calculated velocity and the measured velocity to determine whether a difference between the calculated velocity and the measured velocity is less than a predetermined value; and
repeating the estimating, the calculation of the velocity of the projectile and the comparison with another estimated value for the set of parameters to model a trajectory of the projectile.

In accordance with an embodiment the method further comprises:
an adjustment calculator for determining adjustment information for adjusting the sight of the projectile weapon based on the modelled trajectory and a current angle difference between a barrel axis of the projectile weapon and the sight.

In accordance with an embodiment the method further comprises:
using the following parameters in the modelling of the flight path:
velocity and/or time from the radar,
zero angle,
gravity,
drag coefficient,
ballistic coefficients.

In accordance with an embodiment the method further comprises:
determining the velocity of the projectile at a plurality of time instances;
determining the acceleration based on the plurality of time instances and time differences between the time instances.

In accordance with an embodiment the method further comprises:
performing curve fitting to find out which predetermined curve corresponds the determined velocity, acceleration and the projectile parameters.

An apparatus for modelling a trajectory of a projectile weapon, the apparatus comprising:
an input for receiving information regarding a measured velocity of a projectile in flight at least at one moment of time, which projectile has been fired from a projectile weapon;
an analyzer for determining the velocity and the moment of time;
an estimator for estimating a value for a set of parameters;
a calculator for using the velocity, the moment of time, the estimated value and a zero-in angle of the sight to calculate a velocity of the projectile at the moment of time; and a comparator for comparing the calculated velocity and the measured velocity to determine whether a difference between the calculated velocity and the measured velocity is less than a predetermined value;

wherein the apparatus is configured to repeat the estimating, the calculation of the velocity of the projectile and the comparison with another estimated value for the set of parameters to model the trajectory of the projectile.

The invention is not limited solely to the examples presented in Figures and the above description, but it may be modified within the scope of the appended claims.

I claim:

1. An apparatus for providing information for adjusting a sight of a projectile weapon, the apparatus comprising:
    an input for receiving information regarding a measured velocity of a projectile in flight at least at one moment of time, which projectile has been fired from a projectile weapon;
    an analyzer for determining the measured velocity and the moment of time;
    an estimator for estimating a value for a set of parameters;
    a calculator for using the measured velocity, the moment of time, the estimated value and a zero-in angle of the sight to calculate a velocity of the projectile at the moment of time; and
    a comparator for comparing the calculated velocity and the measured velocity to determine whether a difference between the calculated velocity and the measured velocity is less than a predetermined value;
    wherein the apparatus is configured to repeat the estimating, the calculation of the velocity of the projectile and the comparison with another estimated value for the set of parameters to model a trajectory of the projectile.

2. The apparatus according to claim 1, wherein said apparatus further comprises:
    an adjustment calculator for determining adjustment information for adjusting the sight of the projectile weapon based on the modelled trajectory and a current angle difference between a barrel axis of the projectile weapon and the sight.

3. The apparatus according to claim 1, wherein said apparatus is configured to:
    use the following parameters in the modelling of the flight path:
    velocity and/or time from the radar,
    zero angle,
    gravity,
    drag coefficient,
    ballistic coefficients.

4. The apparatus according to claim 1 configured to:
    determine the velocity of the projectile at a plurality of time instances;
    determine an acceleration based on the plurality of time instances and time differences between the time instances.

5. The apparatus according to claim 4, wherein said apparatus is configured to:
    perform curve fitting to find out which predetermined curve corresponds the determined velocity, acceleration and the projectile parameters.

6. The apparatus according to claim 1 configured to receive the information of frequency or wavelength of the transmitted signal and the information of frequency or wavelength of the reflected signal from a radar.

7. An apparatus for providing information for adjusting a sight of a projectile weapon, the apparatus comprising at least one processor and at least one memory, said at least one memory comprising computer code when executed by at least one of the at least one processor causes the apparatus to:
    receive information of frequency or wavelength of a signal transmitted toward a projectile in flight, which projectile has been fired from a projectile weapon;
    receive information of frequency or wavelength of a signal reflected from the projectile in flight;
    determine a difference of frequency or wavelength between the transmitted signal and the received signal;
    use the difference of frequency or wavelength to determine a velocity and acceleration of the projectile;
    model a flight path of the projectile based on the determined velocity and acceleration of the projectile;
    determine adjustment information for adjusting the sight of the projectile weapon based on the modelled flight path and a current angle difference between a barrel axis of the projectile weapon and the sight.

8. The apparatus according to claim 7, wherein said memory comprises computer code when executed by at least one of the at least one processor causes the apparatus to:
    use the following parameters in the modelling of the flight path:
    velocity and/or time from the radar,
    zero angle,
    gravity,)
    drag coefficient,
    ballistic coefficients.

9. The apparatus according to claim 8, wherein said memory comprising computer code when executed by at least one of the at least one processor causes the apparatus to:
    determine the velocity of the projectile at a plurality of time instances;
    determine the acceleration based on the plurality of time instances and time differences between the time instances.

10. The apparatus according to claim 9, wherein said memory comprising computer code when executed by at least one of the at least one processor causes the apparatus to:
    perform curve fitting to find out which predetermined curve corresponds the determined velocity, acceleration and the parameters used in the modelling of the flight path.

11. A non-transitory computer-readable medium storing a program for providing information for adjusting a sight of a projectile weapon including instructions that, when executed by at least one processor causes an apparatus to:
    receive information of frequency or wavelength of a signal transmitted toward a projectile in flight, which projectile has been fired from a projectile weapon;
    receive information of frequency or wavelength of a signal reflected from the projectile in flight;
    determine a difference of frequency or wavelength between the transmitted signal and the received signal;
    use the difference of frequency or wavelength to determine a velocity and acceleration of the projectile;
    model a flight path of the projectile based on the determined velocity and acceleration of the projectile;
    determine adjustment information for adjusting the sight of the projectile weapon based on the modelled flight path and a current angle difference between a barrel axis of the projectile weapon and the sight.

12. A method for adjusting a sight of a projectile weapon, the method comprising:

receiving information of frequency or wavelength of a signal transmitted toward a projectile in flight, which projectile has been fired from a projectile weapon;

receiving information of frequency or wavelength of a signal reflected from the projectile in flight;

determining a difference of frequency or wavelength between the transmitted signal and the received signal;

using the difference of frequency or wavelength to determine a velocity and acceleration of the projectile;

modelling a flight path of the projectile based on the determined velocity and acceleration of the projectile;

determining adjustment information for adjusting the sight of the projectile weapon based on the modelled flight path and a current angle difference between a barrel axis of the projectile weapon and the sight.

13. The method according to claim 12 comprising:

determining adjustment information for adjusting the sight of the projectile weapon based on the modelled flight path and a current angle difference between a barrel axis of the projectile weapon and the sight.

14. The method according to claim 12 comprising:

using the following parameters in the modelling of the flight path:

velocity and/or time from the radar, zero angle, gravity, drag coefficient, ballistic coefficients.

15. The method according to claim 12 comprising:

determining the velocity of the projectile at a plurality of time instances;

determining the acceleration based on the plurality of time instances and time differences between the time instances.

16. The method according to claim 15 comprising:

performing curve fitting to find out which predetermined curve corresponds the determined velocity, acceleration and the parameters used in the modelling of the flight path.

17. The method according to claim 12 comprising receiving the information of frequency or wavelength of the transmitted signal and the information of frequency or wavelength of the reflected signal from a radar.

* * * * *